United States Patent

[11] 3,625,474

| [72] | Inventor | Julius R. Juede<br>5526 Cleon Ave., Los Angeles, Calif. 91601 |
| --- | --- | --- |
| [21] | Appl. No. | 878,658 |
| [22] | Filed | Nov. 21, 1969 |
| [45] | Patented | Dec. 7, 1971 |

[54] SOLENOID-ACTUATED HIGH-TEMPERATURE FLUID VALVES
4 Claims, 6 Drawing Figs.

[52] U.S. Cl. .................................................. 251/77,
251/129, 251/335 B, 137/612.1
[51] Int. Cl. ....................................................... F16k 31/06
[50] Field of Search ........................................... 251/129,
77, 335 B, 335, 138; 137/612.1

[56] References Cited
UNITED STATES PATENTS

| 1,382,412 | 6/1921 | Campbell | 251/129 X |
| --- | --- | --- | --- |
| 1,983,106 | 12/1934 | Sundstrom | 251/335.2 X |
| 2,052,987 | 9/1936 | Persons | 251/77 X |
| 2,350,352 | 6/1944 | Harding, Jr. | 251/335.2 X |
| 2,743,738 | 5/1956 | Johnson | 251/335.2 X |
| 3,108,777 | 10/1963 | Ray | 251/129 X |
| 3,510,104 | 5/1970 | Wilson et al. | 251/335 |
| 3,528,087 | 9/1970 | Perkins | 251/335 B |

FOREIGN PATENTS

| 1,212,847 | 10/1959 | France | 251/129 |
| --- | --- | --- | --- |
| 505,111 | 12/1954 | Italy | 251/335.2 |

*Primary Examiner*—Arnold Rosenthal
*Attorney*—Allan M. Shapiro

ABSTRACT: High-temperature valves are difficult to seal, and careful sealing is necessary, particularly where the fluid being valved is inflammable or, for other reasons, leakage must be minimized or eliminated. In several species disclosed herein, leakage is minimized by a properly prepared and surface-treated valve stem, for maximum smoothness and minimum wear, together with seals of organic material having the requisite temperature resistance bearing thereagainst. In the preferred species, a bellows is secured between the valve body and the valve disc, with the valve stem limited to axial movement so complete sealing is effected. In a special case, the bellows is a synthetic polymer composition material with the bellows formed unitarily, on one end, with the synthetic polymer composition valve disc.

PATENTED DEC 7 1971

3,625,474

JULIUS R. JUEDE
INVENTOR.

BY Allen M. Shapiro

ATTORNEY

JULIUS R. JUEDE
INVENTOR.

BY Allan M. Shapiro
ATTORNEY

SOLENOID-ACTUATED HIGH-TEMPERATURE FLUID VALVES

BACKGROUND OF THE INVENTION

1. Field of the Invention

This invention is directed to solenoid-actuated high temperature fluid valves and, particularly, to sealing of the moving parts of the valve with respect to the valve body to minimize or eliminate leakage.

2. Description of the Prior Art

Nearly every valve requires two relatively moving parts so that a valve disc can be moved with respect to its seat to open or close the seat opening. A large number of attempts have been made in an effort to provide for minimized or zero leakage past these relatively moving parts. Such minimized or zero leakage is especially necessary in cases where the fluid being valved is especially valuable, inflammable or even toxic. The leakage problems are especially severe where elevated temperatures are encountered because many of the standard packing materials are incapable of adequate life at such elevated temperatures. Furthermore, many gland-sealing materials require lubrication by the fluid being valved in order to minimize wear of the gland-sealing material. Of course, such lubrication requires that there be leakage, even though leakage in such cases is minimized as far as practical.

Particular embodiments in which valves of this invention are applicable are shown in Martin, U.S. Pat. No. 3,210,193 and Quednau, U.S. Pat. No. 3,410,199. These patents are directed to deep-fat cooking devices which include pumps, tanks, filters, cooking pots, and the necessary interconnecting fluid passage means. Furthermore, valves are necessary to control the direction and course of fluid flow. In view of the fact that the cooking oil is heated to a temperature between 350° F. and 395° F., ordinary valving is not appropriate. Oil leakage is objectionable because such leakage is flammable. Furthermore, cooking oil will become rancid so that leaking oil must be cleaned up. Additionally, the leaking os such oil into the operating parts of solenoid valves will soon cause such valves to become gummy. Furthermore, at such temperatures, pilot-operated valves cannot be employed because the high-temperature oil is detrimental to the long life of the solenoid coil insulation. Thus, means must be created whereby the hot oil is prevented from leaking from the valve in such quantities as to become dangerous, objectionable or harmful.

SUMMARY OF THE INVENTION

In order to aid in the understanding of this invention, it can be stated in essentially summary form that it is directed to solenoid-actuated high-temperature fluid valves. The fluid valves of this invention have special sealing between the moving and stationary parts thereof to minimize fluid leakage from the valve. The various species of sealing means of this invention extends from specially treated valve stems, mating with organic sealing rings having sufficient temperature resistance to be used in a particular situation, to bellows interconnected between the valve disc and the valve gland structure so that total sealing is effected.

Accordingly, it is an object of this invention to provide a solenoid-actuated high-temperature fluid valve which has a treated valve stem and an organic ring bearing thereagainst to minimize leakage therefrom. It is a further object to provide a solenoid actuator for the valve stem, which solenoid actuator is spring-loaded in the valve-closed direction so that solenoid energization opens the valve. It is still another object of this invention to provide a solenoid actuator which is interconnected with the valve stem in such a manner that minor misalignments of solenoid-applied force do not cause binding forces in the valve stem to eliminate unnecessary friction in valve stem operation. It is still another object of this invention to provide a bellows interconnected between the valve disc and the valve gland which, in turn, is sealed to the valve body to totally prevent fluid leakage out of the valve along the valve stem. It is another object to provide a fluid valve wherein the valve disc is integrally formed with a bellows, the opposite end of the bellows being sealed with respect to the valve body so that leakage along the valve stem is prevented.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

Figure 1:
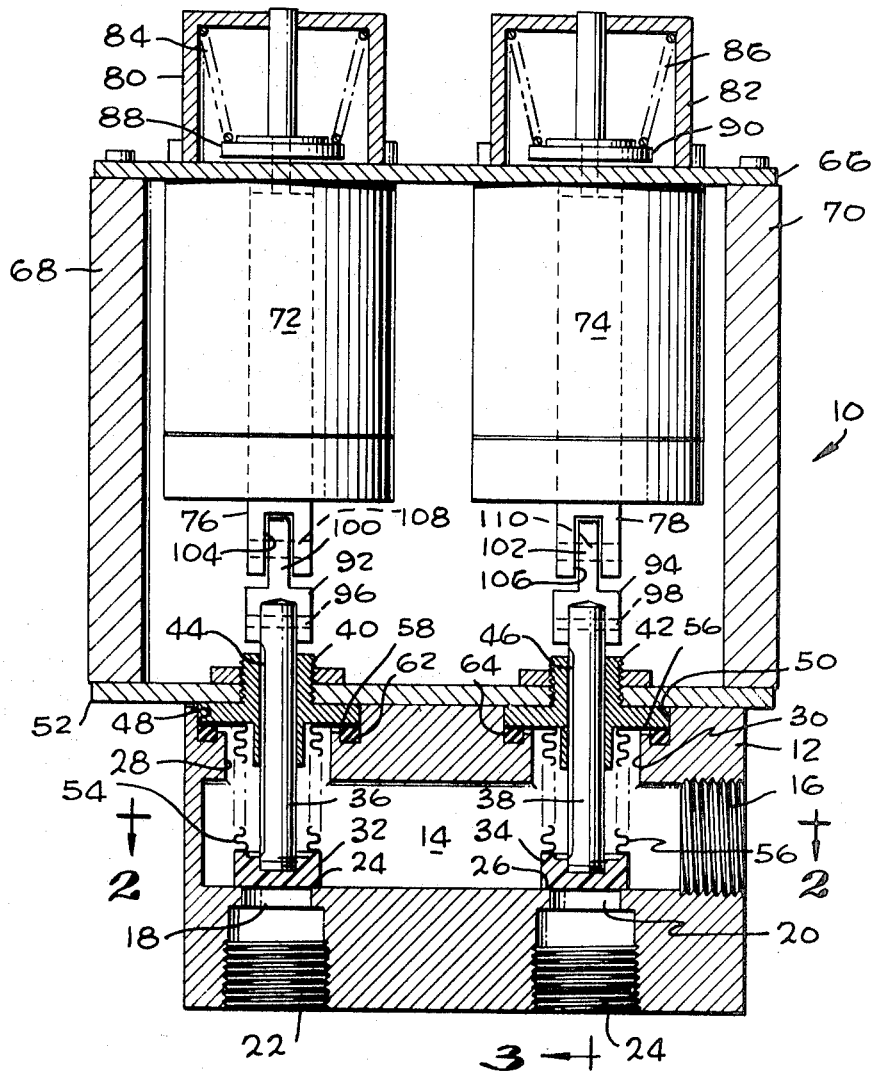
FIG. 1 is a vertical, centerline section taken through the preferred embodiment of the solenoid-actuated high-temperature fluid valve of this invention, with some parts taken in side elevation.
Figure 2:
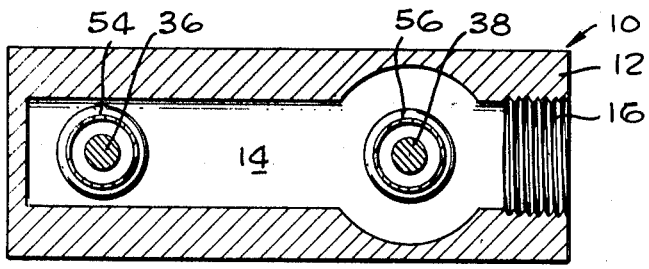
FIG. 2 is a horizontal section taken generally along line 2—2 of FIG. 1.
Figure 3:
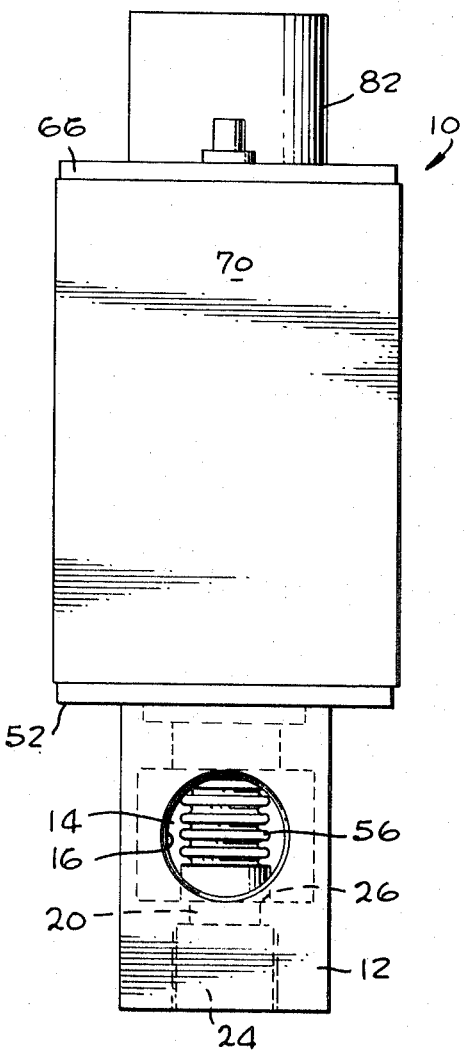
FIG. 3 is an end elevational view of the valve of FIG. 1, seen generally along line 3—3 of FIG. 1.

Referring to FIGS. 1, 2 and 3, the preferred embodiment of the solenoid-actuated high-temperature fluid valve of this invention is generally indicated at 10. Valve 10 has a body 12 in which is located fluid manifold passage 14. Passage 14 has suitable connection means for connection to an external fluid pressure tube, such as pipe threads 16.

Outlet passages 18 and 20 extend from exteriorly of the valve body 12 and intersect with passage 14. Passages 18 and 20 are respectively provided with threads 22 and 24 for connection of outlet conduits to the body.

Any convenient sealing means can be employed at threads 16, 22 and 24, such as flanges and special O-ring seals, provided that they are gasketed to withstand the temperatures to which the valve 10 is to be subjected.

Around the juncture of outlet passages 18 and 20 with the manifold passage 14 are respective valve seats 24 and 26. Valve seats 24 and 26 are accessible from the top of body 12 through openings 28 and 30. Carefully finished, smooth valve seats 24 and 26 are formed by access through these openings. Valve discs 32 and 34 respectively engage against seats 24 and 26 to respectively close outlet passages 18 and 20 from passage 14. It is preferable to apply the pressure in passage 14 so that the pressure tends to force the valve discs against their respective seats for increased valve closure force to result in tighter valve closure. Such minimizes leakage from the inlet passage to the outlet passage.

Valve stem 36 engages on the top of valve disc 32, while valve stem 38 engages on the top of valve disc 34. If desired, and it is preferred, the lower ends of the valve stems 36 and 38 are respectively threaded into the valve discs 32 and 34 so that, when the valve stems are moved upwardly, the valve discs are pulled upward away from their respective seats. The discs 32 and 34 are preferably made out of Teflon or similar synthetic polymer composition material, for this material is especially useful for valving operations at elevated temperature up to about 400° F. Any synthetic polymer composition material which has the required rigidity and nondeterioration characteristics at the desired temperatures is useful for this service. However, Teflon is especially useful for this purpose because of its nonstick characteristics. Valve stems 36 and 38 respectively extend upward through valve stem guides 40 and 42 which serve to guide the stems so that the valve discs are correctly related with respect to their seats 24 and 26. In order to vent the spaces immediately around the valve stem guides, the valve stems respectively have grooves 44 and 46 which extend through the respective valve guides. Valve stem guides 40 and 42 are accurately positioned with respect to valve body 12 by being seated within recesses 48 and 50 within the valve body. The valve stem guides are retained with respect to the valve body by means of retainer plate 52 which is clamped down upon the valve body by any conventional means, such as clamp screws, to clamp the valve stem guides into their recesses.

Sealing between the valve discs 32 and 34 and the valve body 12 is accomplished by convoluted bellows 54 and 56 which are respectively unitarily formed with their valve discs. The convoluted bellows are, thus, of the same material and are sufficiently thin and convoluted so as to permit movement of the valve discs away from their seats. The upper ends of these bellows respectively carry flanges 58 and 60, which extend radially outwardly underneath the flange on the valve stem guide, which engages within the recesses 48 and 50. Seal rings 62 and 64 are inserted in seal ring grooves adjacent the flanges 58 and 60, so that the flanges on the valve stem guides force the flanges on the bellows into sealing engagement with the seal rings. Alternatively, the seal rings 62 and 64 can be unitarily formed with the flanges 58 and 60 of the bellows 54 and 56, respectively.

Top plate 66 is spaced from and secured to retainer plate 52 by means of spacers 68 and 70, although it will be understood that plate 66 may be the lid of a box of which elements 68 and 70 are walls and plate 52 is a bottom. Solenoids 72 and 74 are mounted thereon. Solenoids 72 and 74 respectively comprise electromagnetic coils in which are located movably mounted cores or plungers 76 and 78, respectively. The plungers are moved upwardly when the coils are energized. Above top plate 66, housings 80 and 82 respectively house compression springs 84 and 86 which bear down upon washers 88 and 90. The washers are mounted on the upper ends of plungers 76 and 78 preferably by a nonmagnetic extension, so that the plungers are urged to a downward position when the solenoid coils are unenergized.

The upper ends of valve stems 36 and 38 respectively carry links 92 and 94. These links are secured to their valve stems by means of a close fit of the valve stem into the holes in the links together with pins 96 and 98 which interengage between the links and the valve stems. The upper ends of the links 92 and 94 carry flat webs 100 and 102 which extend into the bifurcating slots 104 and 106 in the lower ends of the plungers 76 and 78. Pins 108 and 110 respectively engage through the lower ends of plungers 76 and 78, and there engage webs 100 and 102, but the holes through the webs are enlarged so that the fit is fairly loose. Furthermore, as is seen in the drawings, the webs fit loosely within the slots in the plungers so that relative motion in all directions is possible. This relative motion is fairly limited but is sufficient to permit movement of the plungers without imparting any undue misaligning force onto the valve stems.

Accordingly, when the solenoids are energized, the plungers are moved upwardly, drawing the valve stems upward and, consequently, drawing the valve discs away from their seats to cause opening of the valves. Deenergization of the solenoids permits the springs 84 and 86 to thrust the plungers downward, pushing the discs down upon their seats to again close the valves. Either or both of the solenoids can be energized for selective actuation of either of the valve discs away from their seats. As is best seen in FIG. 2, passage 14 is enlarged around valve stem 36 and convoluted bellows 56 so that full-size passage from the threaded inlet passage 16 to opening 18 is available.

With respect to the materials of the valve discs, the convoluted bellows secured thereto, and the upper seal flanges, it is clear that metallic materials can be employed instead of synthetic polymer composition materials should higher temperatures of satisfactory operation be required. However, in the case of a valve with Teflon bellows and disc which is particularly designed for employment with hot cooking oil, 400° F. operation is a satisfactory upper limit.

Figure 4:
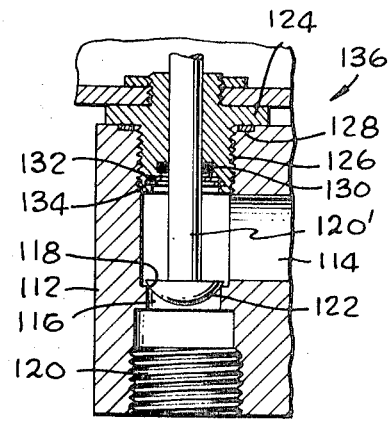
FIG. 4 is a partial vertical section through a part of the valve shown in FIG. 1, showing a different embodiment of the stem-sealing means.

The embodiment of FIG. 4 illustrates a solenoid-actuated high-temperature fluid valve 136 which has the same solenoid operating structure and interconnecting linkage with the valve stem as that shown in FIG. 1 and 3. Valve body 112 has an inlet passage 114 therein which is connected to an outlet passage 116 past valve seat 118. The outlet passage has suitable connection threads 120. Thus, the body 112 is substantially identical to the body 12 of FIGS. 1-3.

Valving is accomplished by means of a valve stem 120' on which is unitarily formed valve disc 122. The material of the stem and disc is preferably stainless steel, appropriately passivated so that it is substantially nonreactive with respect to the material which is valved. The face of the valve disc is a portion of a spherical surface so that a theoretically tight engagement is obtained on seat 118 which is theoretically the sharp circular edge between a cylinder and a transverse plane.

Valve stem 120' passes through valve stem guide 124. Guide 124 is screwed into body 112 by means of screw threads 126. Seal 128, in the form of an organic resilient seal ring prevents leakage between the valve stem guide and the body.

Sealing between the valve stem and valve stem guide is accomplished by a synthetic, rubberlike O-ring 130 which is retained in its groove by means of washer 132 which, in turn, is retained in its bore by means of snapring 134 in an appropriate snapring groove. This type of construction is employed for those resilient materials which are useful in seals but are not sufficiently resilient to be pressed into an inner groove.

Figure 5:
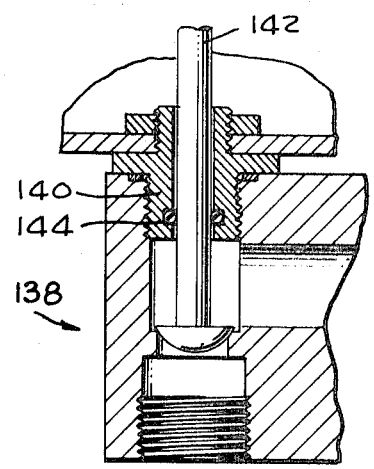
FIG. 5 is a view similar to FIG. 4, showing still another stem-sealing means.
Figure 6:
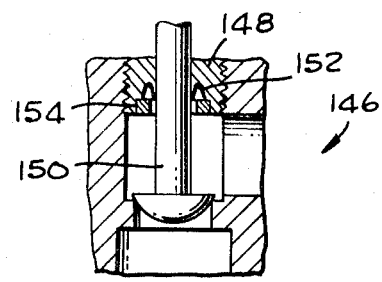
FIG. 6 is still another view similar to FIG. 4, showing another embodiment of the stem-sealing means.

The valve body, the valve stem and the valve disc in FIG. 5 are identical to those structures found in FIG. 4. The valve in FIG. 5 is generally indicated at 138. Furthermore, the external sealing of the valve stem guide 140 in valve 138 is the same as the valve stem guide 124. However, the sealing between the valve stem guide 140 and valve stem 142 therein is accomplished by means of an oversized Viton O-ring 144 which is located in an appropriate groove. In this case, the Viton O-ring has more flexibility and resiliency than the O-ring 130 so it can be pressed into an undercut groove as is shown in FIG. 5. In order to aid in frictionless sealing of valve stem 142 against the O-ring 144, valve stem 142 is surface-treated by being coated with a graphite-molybdenum-based material, which is baked into the surface layer of the valve stem. This provides a low stiction coefficient to the surface of the shaft so that the valve stem 142 can relatively easily slide with respect to the O-ring 144. Additionally, the adhesion of foreign material, such as carbonized oil, onto the valve stem is inhibited. For both of these reasons, sealing of the O-ring against the valve stem is enhanced.

Valve 146 is identical to valve 138, except for the seal means between valve stem guide 148 and valve stem 150. Again, the valve stem 150 is baked in a graphite-molybdenum-based material to provide an antistick valve stem which resists adhesion of foreign materials and resists stickiness with respect to motion within the valve stem guide and the seal thereon. Valve stem guide 148 contains an annular chevron 152 which is made of Teflon. Retainer ring 154 engages the outer lip of the chevron, to retain the chevron in its groove. The inner lip of the chevron is free to engage the shaft and the Teflon chevron annular seal ring 152 is formed with resiliency so that the seal lip is resiliently engaged with the valve stem. Thus, low stickiness due to the inherent characteristics of the Teflon and the surface treatment of the valve stem provide for an easily moved valve stem and disc. Furthermore, the antistick characteristics of the valve stem inhibit the deposit of foreign material thereon so that seal life is enhanced.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A fluid valve, said valve comprising:
   a. a body, an inlet passage and an outlet passage in said body for the flow of fluid therethrough, a seat in said body between said inlet and said outlet passages;
   b. a valve stem guide secured to said body, a valve stem reciprocably movable within and extending through said valve stem guide, a disc on said valve stem, said disc being movable into and out of engagement with respect to said seat in said body to selectively open and inhibit fluid passage between said inlet an outlet passages in said body;
   c. seal means engaged between said valve stem and said body to inhibit leakage between said valve stem and said body; and
   d. valve operator means connected to said valve stem to move said valve disc with respect to said seat, said valve operator means comprising:
      1. a solenoid coil stationarily mounted with respect to said valve body,
      2. a plunger movably mounted with respect to said solenoid coil so that electric energization of said solenoid coil urges said plunger with respect to said solenoid coil,
      3. a lost-motion linkage connecting said plunger to said valve stem, said lost-motion linkage comprising a pin engaged in a hole, said hole being larger than said pin, the axes of said pin and said hole being substantially at right angles to the direction of movement of said valve stem, and
      4. a flange secured to said valve stem, said hole being located in said flange, said plunger being bifurcated and embracing said flange, said pin being secured in said bifurcated plunger.

2. The valve of claim 1 wherein:
   5. a washer is secured to and spaced from said plunger by means of nonmagnetic interconnection means and
   6. a compression spring is engaged between said valve body and said washer to urge said plunger in such a direction as to urge said valve stem in a direction where said disc is seated on said seat.

3. A fluid valve, said valve comprising:
   a. a body, an inlet passage and an outlet passage in said body for the flow of fluid therethrough, a seat in said body between said inlet and said outlet passages;
   b. a valve stem guide secured to said body, a valve stem reciprocably movable within and extending through said valve stem guide, a disc on said valve stem, said disc being movable into and out of engagement with respect to said seat in said body to selectively open and inhibit fluid passage between said inlet and outlet passages in said body;
   c. seal means engaged between said valve stem and said body to inhibit leakage between said valve stem and said body, said seal means comprising:
      1. a bellows having a fixed end and a movable end and being convoluted therebetween so that said movable end can move with respect to said body,
      2. said movable end being secured with respect to said valve disc, and
      3. said fixed end of said bellows carries an outwardly extending flange thereon, said flange being clamped between said valve stem guide and said body to seal said fixed end of said bellows with respect to said body; and
   d. valve operator means connected to said valve stem to move said valve disc with respect to said seat, said valve operator means comprising;
      1. a solenoid coil stationarily mounted with respect to said valve body, and
      2. a plunger movably mounted with respect to said solenoid coil so that electric energization of said solenoid coil urges said plunger with respect to said solenoid coil,
      3. a lost-motion linkage connecting said plunger to said valve stem,
      4. a washer secured to said plunger, and
      5. a compression spring engaged between said valve body and said washer to urge said plunger in such a direction as to urge said valve stem in a direction where said disc is seated on said seat.

4. The valve of claim 3 wherein said valve disc, said bellows and said flange on said bellows are unitarily formed from synthetic polymer composition material.

* * * * *